US 6,707,489 B1

(12) United States Patent
Maeng et al.

(10) Patent No.: US 6,707,489 B1
(45) Date of Patent: Mar. 16, 2004

(54) AUTOMATIC VOICE TRACKING CAMERA SYSTEM AND METHOD OF OPERATION

(75) Inventors: Joonyoul Maeng, Austin, TX (US); Errol R. Williams, Round Rock, TX (US)

(73) Assignee: Forgent Networks, Inc., Austin, TX (US)

( * ) Notice: Subject to any disclaimer, the term of this patent is extended or adjusted under 35 U.S.C. 154(b) by 0 days.

(21) Appl. No.: 09/207,237

(22) Filed: Dec. 8, 1998

Related U.S. Application Data

(62) Division of application No. 08/509,228, filed on Jul. 31, 1995.

(51) Int. Cl.[7] .............................................. H04N 5/232
(52) U.S. Cl. ................................ 348/211.12; 348/14.08
(58) Field of Search ......................... 348/211.99, 211.1, 348/211.4, 211.11, 211.12, 14.01, 14.07, 14.11, 14.12, 36, 143; 381/92

(56) References Cited

U.S. PATENT DOCUMENTS

| | | | |
|---|---|---|---|
| 4,536,887 A | | 8/1985 | Kaneda et al. ................. 381/92 |
| 5,058,170 A | | 10/1991 | Kanamori et al. ............. 381/92 |
| 5,179,421 A | | 1/1993 | Parker et al. ................. 356/152 |
| 5,206,721 A | * | 4/1993 | Ashida et al. ............... 348/14.1 |
| 5,268,734 A | | 12/1993 | Parker et al. ................. 356/152 |
| 5,272,526 A | * | 12/1993 | Yoneta et al. ............... 348/14.1 |
| 5,335,011 A | * | 8/1994 | Addeo et al. ............... 348/14.1 |
| 5,382,972 A | * | 1/1995 | Kannes ..................... 348/14.07 |
| 5,581,620 A | | 12/1996 | Brandstein et al. ........... 381/92 |
| 5,625,410 A | * | 4/1997 | Washino et al. ............. 348/552 |
| 5,686,957 A | * | 11/1997 | Baker .......................... 348/36 |
| 5,714,997 A | * | 2/1998 | Anderson ..................... 348/36 |
| 5,737,431 A | * | 4/1998 | Brandstein et al. ........... 381/92 |

OTHER PUBLICATIONS

Johnson et al., Computer steered microphone arrays for sound transduction in large rooms, Nov. 1985, Acoustical Society of America, vol. 78, No. 5; pp. 1508–1518.*

Michael S. Brandstein and Harvey F. Silverman, A New Time–Delay Estimator for Finding Source Locations Using a Microphone Array, Technical Report LEMS–116, Division of Enginnering, Brown University, Mar. 1993.

Paul C. Meuse, Harvey F. Silverman, Characterization of Talker Radiation Pattern Using a Microphone Array, LEMS, Division of Engineering, Brown University.

Harvey F. Silverman and Stuart E. Kirtman, A two–stage algorithm for determininnig talker location from linear microphone array data, *Computer Speech and Language* (1992)6, 129–152.

\* cited by examiner

*Primary Examiner*—Aung Moe
(74) *Attorney, Agent, or Firm*—Hamilton & Terrile, LLP; Robert W. Holland

(57) ABSTRACT

An automatic voice tracking camera system (12) and method of operation are disclosed. The system (12) includes a first camera (18) and a camera controller (36). The first camera (18) is operable to receive control signals for controlling a view of the first camera (18). The camera controller (36) is operable to determine a responsive camera movement of the first camera (18) based upon coordinates for a point in space where the determination comprises comparing the coordinates with a first spacial region (90) defined around a current speaker position. The camera controller (36) is then operable to generate camera control signals based upon the appropriate responsive camera movement and to provide the camera control signals to the first camera (18). In one embodiment, the camera controller is further operable also to compare the coordinates with a second spacial region (92) defined around the current speaker position.

24 Claims, 4 Drawing Sheets

WINDOW 1
x_diff1=A*f$_a$(zoom)
y_diff1=B*f$_b$(zoom)
z_diff1=C*f$_c$(zoom)

WINDOW 2
x_diff2=D*f$_d$(zoom)
y_diff2=E*f$_e$(zoom)
z_diff2=F*f$_f$(zoom)

NEW POSITION
$P_n$ | $X_n$ | $Y_n$ | $Z_n$ |

CURRENT CAMERA POSITION
$P_c$ | $X_c$ | $Y_c$ | $Z_c$ |

OTHER CAMERA POSITION
$P_o$ | $X_o$ | $Y_o$ | $Z_o$ |

NEW AVERAGE POSITION
$P_a$ | $X_a$ | $Y_a$ | $Z_a$ |

AUTOMATIC VOICE TRACKING CAMERA SYSTEM AND METHOD OF OPERATION

CROSS REFERENCE TO RELATED APPLICATIONS

This application is a divisional from U.S. patent application Ser. No. 08/509,228, filed Jul. 31, 1995, and entitled "Automatic Voice Tracking Camera System and Method of Operation."

TECHNICAL FIELD OF THE INVENTION

This invention relates in general to the field of video conferencing, and more particularly an automatic voice tracking camera system and method of operation.

BACKGROUND OF THE INVENTION

In conventional video conferencing systems, infrared technology has been employed to track the position of a speaker in the video conference. This conventional method uses an IR transmitter and three IR receivers to triangulate the position of the IR transmitter which is carried by the speaker. This type of system may not work well in a conference room environment where a number of persons may talk at any given time.

A second conventional method for tracking a speaker is the use of touch-to-talk microphones. The position of each microphone is preset in order to direct a camera when a speaker touches a microphone to talk. The positions of the microphones are preloaded in the system so that the system knows where each speaker is to be located. This may be undesirable because it requires fixed positions of speakers, limits the movement of speakers, and is not easily portable.

Microphone array technology is being introduced in the video conferencing field in order to improve the reception of a sound and to allow location of the position of the source of the sound. This microphone array technology can be used in both conference room and classroom environments. The position information from such a microphone array is problematic if used to direct a camera because the position information changes continuously due to the movement of speakers and due to errors in locating the position of the speakers.

It is desirable in a video conferencing environment to provide automatic voice tracking of a speaker in order to control cameras such that there is natural camera movement in viewing a given speaker.

SUMMARY OF THE INVENTION

In accordance with the present invention, an automatic voice tracking camera system and method of operation are provided that substantially eliminate or reduce disadvantages and problems associated with previously developed video conferencing systems.

According to one aspect of the present invention, an automatic voice tracking camera system includes a first camera and a camera controller. The first camera is operable to receive control signals for controlling a view of the first camera. The camera controller is operable to determine a responsive camera movement of the first camera based upon coordinates for a point in space where the determination comprises comparing the coordinates with a first spacial region defined around a current speaker position. The camera controller is then operable to generate camera control signals based upon the appropriate responsive camera movement and to provide the camera control signals to the first camera. In one embodiment, the camera controller is further operable also to compare the coordinates with a second spacial region defined around the current speaker position.

According to another aspect of the present invention, a method is provided for automatically controlling a camera. The method includes determining an appropriate responsive camera movement from coordinates for a point in space where the coordinates are compared with a first spacial region defined around a current speaker position. Camera control signals are then generated based upon the appropriate responsive camera movement, and the camera control signals are provided to a first camera.

A technical advantage of the present invention is the automation of tracking a speaker in a video conference such that the camera views the speaker using only the voice of the speaker to determine the speaker's position.

Another technical advantage of the present invention is the use of two cameras whereby a non-active camera can be used to find and view a new speaker prior to switching between the two cameras. In this manner, a switch to a new speaker does not include a scan between the two speakers.

A further technical advantage of the present invention is the movement of a camera to a new view only if the speaker's position moves outside of a defined window. Thus, a minor position change is not translated into movement of the camera.

An additional technical advantage of the present invention is the use of a second defined window to determine whether a current camera or other camera should be used to view the speaker when the speaker's position moves outside of the first defined window.

Another technical advantage of the present invention is the filtering of speaker position information to delay movement of the camera until a new position is verified. In this manner, insignificant noises that might otherwise result in a camera movement are filtered.

A further technical advantage of the present invention is the use of zoning of a conference room. A conference room is divided into a number of zones each associated with one camera. Each camera is then controlled to view speakers within its associated zone.

BRIEF DESCRIPTION OF THE DRAWINGS

A more complete understanding of the present, invention and advantages thereof may be acquired by reference to the following description taken in conjunction with the accompanying drawings in which like reference numbers indicate like features and wherein.

DETAILED DESCRIPTION OF THE INVENTION

Figure 1:
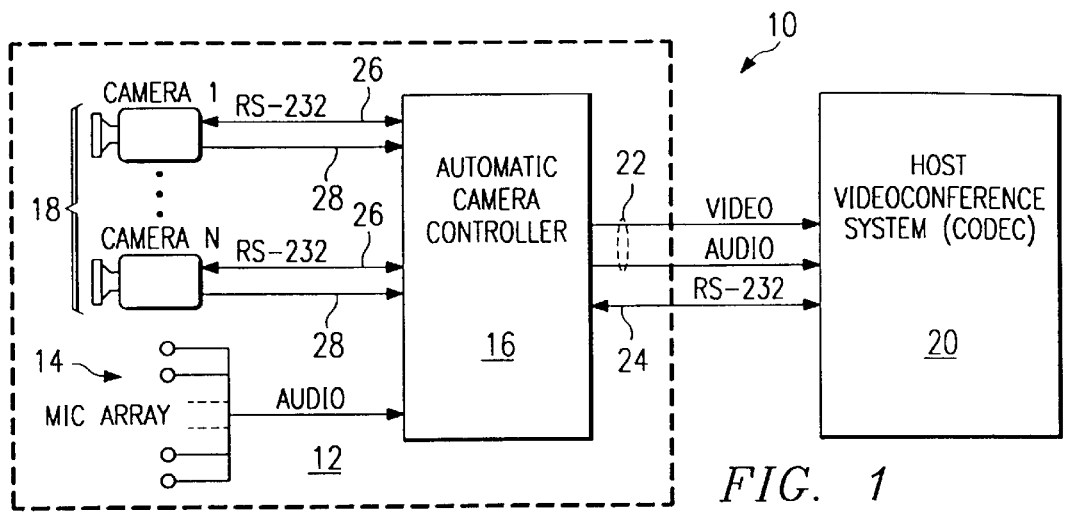
FIG. 1 is a block diagram of a video conferencing system including an automatic voice tracking camera system according to the present invention.

FIG. 1 is a block diagram of a video conferencing system, indicated generally at 10, including an automatic voice tracking camera system 12 according to the present invention. Note that the illustrated embodiment of FIG. 1 shows use of the invention with a video conferencing system. This illustration, however, is not meant to limit the scope of the invention. The present invention may be practiced with many types of video systems. For example, an automatic tracking system for showing an individual in an auditorium or other grouping of people may effectively use the present invention.

System 12 comprises a microphone array 14. Microphone array 14 includes a plurality of microphones positioned in a room in which one party to a video conference is serviced by system 12. In one embodiment of the present invention, microphone array 14 comprises from twelve to sixteen microphones. This number of microphones is not, in any way, intended to be limiting. As many as 500 microphones or more may be used with the present invention. Microphone array 14 provides an audio signal to an automatic camera controller 16. The audio signal represents received sound from the room including the voice of a speaker in the room.

System 12 comprises a plurality of cameras 18 located in the video conference room. Cameras 18 include a first camera, CAMERA 1, through an Nth camera, CAMERA N. In one embodiment of the present invention, each camera 18 comprises a pan-tilt-zoom (PTZ) camera. In other embodiments, one or more camera 18 may comprise a wide angle camera or other suitable type of camera.

Automatic camera controller 16 is coupled to and communicates with a host video conference system 20. Automatic camera controller 16 provides video and audio signals 22 to host video conference system 20. Automatic camera controller 16 also communicates with host video conference system 20 through a communication link 24. In the illustrated embodiment, communication link 24 comprises an RS-232 communication link. Cameras 18 communicate with automatic camera controller 16 through communication links 26. In the illustrated embodiment, communication links 26 comprise RS-232 communication links. Cameras 18 also provide video signals 28 to automatic camera controller 16 that represent the picture viewed by each camera 18.

In operation, microphone array 14 receives sound from within a room in which part of a video conference takes place. Microphone array 14 then provides an audio signal to automatic camera controller 16 representing the received sound. Automatic camera controller 16 operates to automatically point and track cameras 18 to the source of the sound. In a video conference, the sound received comprises the voice of a speaker which is used to track the speaker's position. In one embodiment of the present invention, system 12 comprises only one camera 18 which is automatically directed to the speaker. In other embodiments, system 12 comprises two or more cameras 18 from which a camera is automatically selected and directed to track the speaker.

Automatic camera controller 16 processes the audio signal provided by microphone array 14. Automatic camera controller 16 then generates control signals to cameras 18 to automatically track cameras 18 to the source of the sound. In this manner, automatic camera controller 16 operates to point an active camera 18 to a speaker based upon reception of the voice of that speaker. Automatic camera controller 16 provides the processed audio signal from microphone array 14 and the video signal from the active camera 18 to host system 20. In the illustrated embodiment, the audio signal and video signal are one-way signals from automatic camera controller system 16 to host system 20. Communication link 24 is used for communication between host system 20 and automatic camera controller 16.

Automatic camera controller 16 processes the audio signal received from microphone array 14 in order to determine a position of a speaker. Automatic camera controller 16 then operates to control cameras 18 based on the speaker position information obtained from the audio signal processing In general, automatic camera controller 16 determines whether a camera 18 needs to move in order to view the speaker, selects an appropriate camera 18 to move if necessary, and moves the appropriate camera 18.

Figure 2:
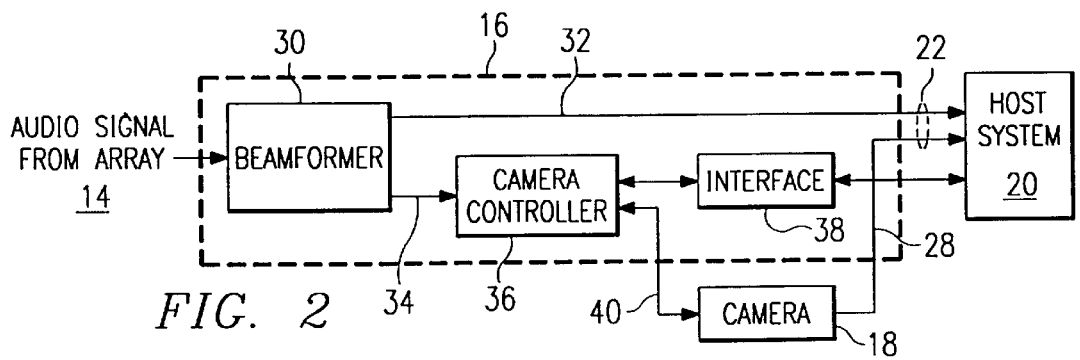
FIG. 2 is a block diagram of one embodiment of an automatic voice tracking camera system of the present invention.

FIG. 2 is a block diagram of an embodiment of automatic camera controller 16 of FIG. 1 according to the present invention. As shown in FIG. 2, automatic camera controller 16 comprises a beamformer 30. Beamformer 30 is coupled to microphone array 14. Beamformer 30 receives the audio signal provided by microphone array 14. Beamformer 30 provides a processed audio signal 32 to host system 20. Beamformer 30 also provides speaker position data 34. Speaker position data 34 represents the position of the source of the sound represented by the audio signal received from microphone array 14. In a video conference, the sound comprises the voice of a speaker and the position of the voice coincides with the position of the speaker. The word "speaker" is used herein generally to refer to the source of the sound tracked by the cameras although that sound could include sounds other than the voice of a speaker.

A camera controller 36 receives speaker position data 34. Camera controller 36 is coupled to an interface 38 and to camera 18. As discussed above, other embodiments of the present invention comprise more than one camera 18. Camera controller 36 generates and provides control signals 40 to camera 18 in order to direct the view of camera 18. Interface 38 is coupled to host system 20 to provide a communication link. As shown, camera 18 provides video signal 42 to automatic camera controller 16 which is, in turn, provided to host system 20.

The operation of microphone array 14 and beamformer 30 in FIG. 2 are described in more detail in U.S. patent application Ser. No. 08/399,427, entitled "Methods and Apparatus for Source Location Estimation From Microphone Array Time Delay Estimates" and U.S. patent application Ser. No. 08/231,646 entitled "Method and Apparatus for adoptive Beamforming" the disclosures of which are incorporated herein by reference.

Beamformer 30 determines the position of the speaker by processing the audio signal received from microphone array 14. Beamformer 30 then transfers the processed audio signal to host system 20 and transfers the position of the speaker to camera controller 36 in the form of speaker position data 34. In one embodiment of the present invention, speaker position data 34 comprises Cartesian coordinates defining the location of the speaker and accuracy of prediction of the speaker position.

Camera controller 36 determines an appropriate responsive camera movement based upon speaker position data 34. Camera controller 36 then generates camera control signals 26 and provides camera control signals 26 to camera 18 such that the view of camera 18 automatically tracks the position of the speaker. In other embodiments of the present invention, camera controller 36 controls two or more cameras 18 in order to track the speaker. In one embodiment of the present invention, camera controller 36 generates pan-tilt-zoom control commands for moving camera 18 which comprises a pan-tilt-zoom (PTZ) camera.

Camera controller 36 communicates with host system 20 using interface 38. Interface 38 provides a communication link 24 between host system 20 and camera controller 36 in order to allow download of new software and transmission of host commands as well as other communication functions.

Figure 3:
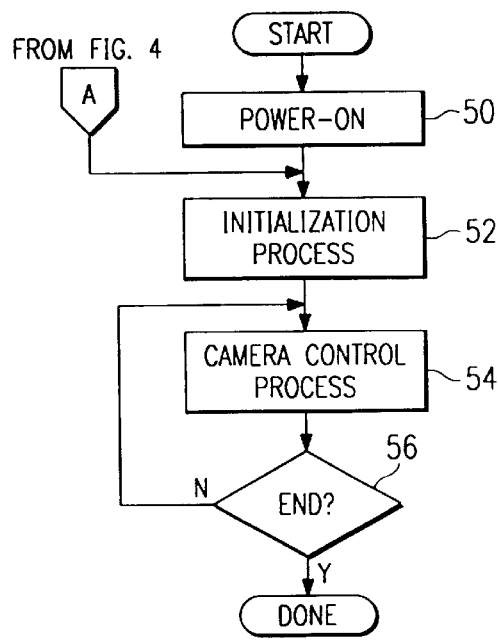
FIG. 3 is a flow chart of one embodiment of a process for initializing and controlling cameras according to the present invention.

FIG. 3 shows a flow of a process for initializing and controlling cameras. When voice tracking system 12 is turned on, camera controller 36 within automatic camera controller 16 goes through initialization process 52 to set up register values, determine number of cameras to be controlled, and geometric relationship between the microphone array 14 and the cameras 18. Once the initialization process 52 is complete, the controller 36 move to control process 54 and starts taking position data of a speaker from the beamformer 30 as well as control commands from the host 20 through the interface 38.

A technical advantage of the present invention is the automation of tracking a speaker in a video conference such that the camera views the speaker using only the voice of the speaker to determine the speaker's position.

FIG. 3 is a flow chart of one embodiment of a process for controlling cameras according to the present invention. The automatic control of cameras is accomplished by the camera controller described above. In step 50, the power for the camera controller is turned on. After power-on, the camera controller executes an initialization process in step 52. Then, in step 54, the camera controller executes a camera control process. In step 56, the camera controller determines whether the video conference has ended. If so, the camera controller has completed camera control. If not, the camera controller repeats the camera control process of step 54 until the video conference has ended.

The initialization process of step 52 includes initialization and position alignment of the camera or cameras in the room. Alignment includes determining the relationship between the microphone array and each camera. The camera controller is then initialized appropriately One method for determining the relationship is to have a person talk in the video conference room. The camera is then forced to point to and view the person. The differences between position data obtained by the beamformer and the pan, tilt, and zoom values read from the camera is the offset. The offset obtained therefrom is used as the relationship of the camera relative to the microphone array and to initialize the camera controller.

The camera control process of step 54 involves determining whether a command has been received from the host system through the interface. If so, the host command is interpreted by the camera controller and passed to the camera or used to control the microphone array as appropriate.

Figure 4:
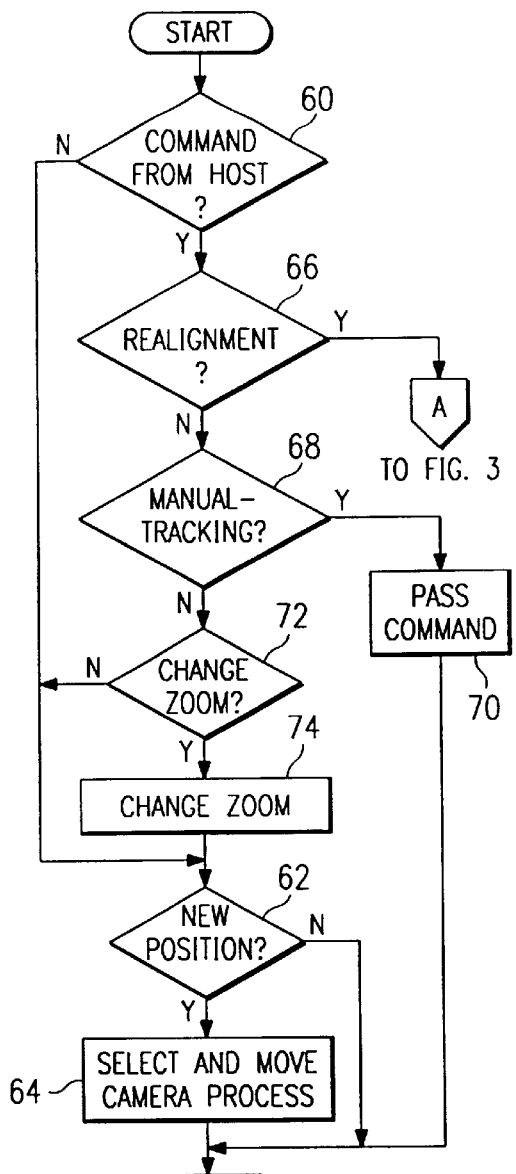
FIG. 4 is a flow chart of one embodiment of the camera control process of FIG. 3.

FIG. 4 is a flow chart of one embodiment of the camera control process of step 54 of FIG. 3. A user may turn off the auto-tracking capability and manually control the camera. If the host command is not a command requiring action by the camera controller, the camera controller forwards the host command to the camera and turns off automatic control until the host turns on the automatic tracking. In step 60, the camera controller determines whether a command was received from the host system. If not, in step 62, the camera controller determines whether the speaker has moved to a new position. If not, then the current iteration of the camera control process is completed and the camera controller continues at step 56 in FIG. 3.

If, in step 64, the speaker has changed position, the camera controller executes the select and move camera process of step 64. The process of step 64 is described in more detail below. In general, in step 64, the camera controller determines whether a camera should be moved, selects the camera to move, controls the appropriate camera to view the new position and switches between cameras if necessary.

If, in step 60, a command was received from the host system, then the camera controller determines whether realignment is necessary in step 66. If so, the camera controller returns to the initialization process of step 52 in FIG. 3. If not, in step 68, the camera controller determines whether manual tracking is indicated by the host command. If so, in step 70, the camera controller passes the host command to the camera and turns off automatic control until the host turns on the automatic tracking. Following step 70, the camera controller returns to step 56 of FIG. 3.

If, in step 68, manual tracking is not indicated, then in step 72, the camera controller determines whether the host command is a change of zoom. If so, the camera controller changes the zoom in step 74 and uses it as a new zoom set up. If not, the camera controller returns to step 62. After changing the zoom in step 74, the camera controller also returns to step 62.

In step 62, the camera controller determines whether the speaker has moved to a new position by processing the position information representing the position of the voice of the speaker. In one embodiment of the present invention, the camera controller receives new position information from the beamformer. In one embodiment, the camera controller receives two pieces of information from the beamformer. One piece is the position of the speaker when that position changes, and the other piece is an accuracy indicator associated with the position information. The accuracy indicator represents how accurately the position information represents the position of the speaker.

In the select and move camera process of step 64, the camera controller uses different methods to select and move cameras depending on the number of cameras coupled to the camera controller. One embodiment of the select and move camera process is described in more detail below. In this embodiment of the present invention, this process for a one-camera system is a subset of that for a two-camera system.

In a one-camera embodiment, the camera controller determines whether the camera needs to be moved when the camera controller receives new position information. This determination is accomplished by examining whether the new position is outside a window defined with respect to the current camera position. This use of a defined window is important because a speaker may move slightly and remain inside the frame of the picture viewed by the camera. The defined window prevents an attempt to center the camera continuously, which would be distracting to the users. The size of the defined window can be varied according to the zoom range of the camera. If the camera is zoomed-in, the window can be defined smaller so a small change in position triggers a movement of the camera. On the other hand, if the camera is zoomed-out, the window can be defined larger so only a relatively large change in position triggers a movement of the camera. The windowing is used in this manner because a zoomed-out camera covers a larger area than a zoomed-in camera.

In a two-camera embodiment, there are two selection criteria with respect to the windowing function. The camera controller first checks if the new position is within the defined window of the active or current camera as described above. If not, one of the two cameras needs to be moved to track the new position of the speaker. The camera controller determines which camera to move by applying a second defined window. The second window is defined with respect to the current camera and encompasses a larger area than the first window. If the new position is relatively close to the current camera, the new position falls within the second window. In this case, the current camera is moved to track the new position. If the new position is not within the second window, the camera controller moves the second or other camera to track the new position and switches the active video after the other camera has moved to cover the new position. After this switch, the other camera becomes the current camera.

Another technical advantage of the present invention is the use of two cameras whereby a non-active camera can be used to find and view a new speaker prior to switching between the two cameras. In this manner, a switch to a new speaker does not include a scan between the two speakers.

Figure 5:
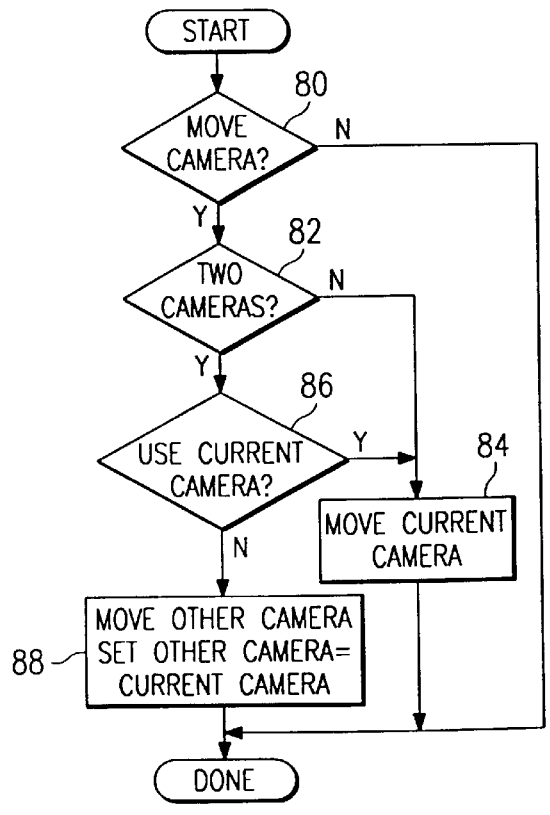
FIG. 5 is a flow chart of the select and move camera process of FIG. 4.

FIG. 5 is a flow chart of one embodiment of the select and move camera process of step 64 of FIG. 4. In step 80, the camera controller determines whether or not a camera needs to be moved by analyzing the new position with respect to the defined window of the current camera. If not, then no camera selection or movement is necessary. If so, in step 82, the camera controller determines whether there is one or there are two available cameras. It should be understood that embodiments comprising more than two cameras can also be implemented according to the present invention.

If there is one camera, the camera controller moves the current camera in step 84. Of course, the current camera is the only camera. If there are two available cameras, the camera controller determines whether or not to use the current camera in step 86. This determination uses a second defined window as described above. If the current camera is to be moved, the camera controller moves the current camera in step 84. Otherwise, in step 88, the camera controller moves the other camera, and then sets the other camera to be the current camera. This switch means that the previously current camera becomes the other camera.

Figure 6:
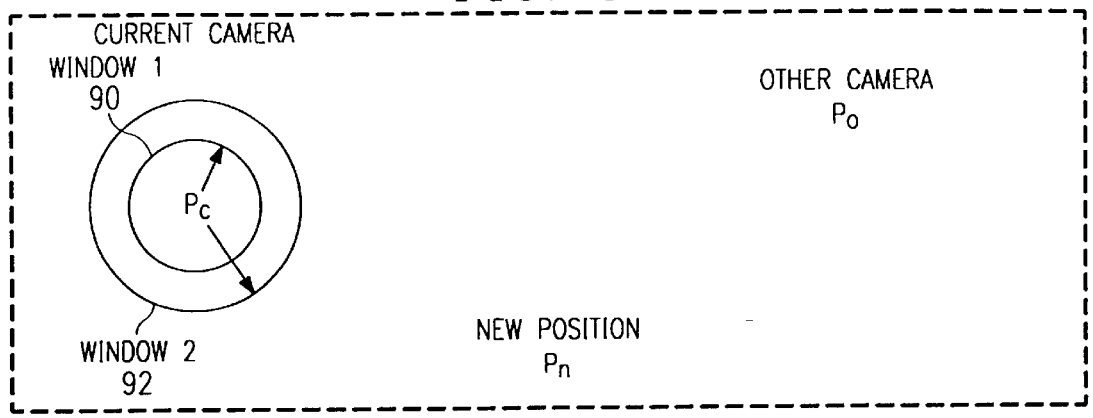
FIG. 6 is a two-dimensional view of one embodiment of the use of windowing for camera selection and movement according to the present invention.

FIG. 6 is a two-dimensional view of one embodiment of the use of windowing for camera selection and movement according to the present invention. It should be understood that three dimensional windows can be used by adding a third coordinate.

As shown in FIG. 6, the current camera is directed to view a position $P_c$ and the other camera is directed to view a position $P_o$. The position of the current camera $P_c$, coincided with the position of the speaker prior to movement of the speaker to a new position. The new position, $P_n$, represents the new position of the speaker after movement.

With respect to the current camera, a first window, WINDOW 1, and a second window, WINDOW 2, are defined. The first window defines a region 90, and the second window defines a region 92. Region 90 of WINDOW 1 represents the area in which no camera movement is needed. Region 92 of WINDOW 2 represents the area in which the current camera will be moved to track the new position, and the remaining area is the region in which the other camera will be moved. It should be understood that other embodiments having more than two cameras can also be implemented.

In FIG. 6, if new position $P_n$ falls within region 90, there is no change in camera position. If new position $P_n$ falls within region 92, the current camera is moved to be directed to and viewing the new position $P_n$. After this movement, the position of the current camera $P_c$ is the same as the new position $P_n$. Lastly, if the new position $P_n$ falls outside of region 92, the other camera is moved. In this case, the position of the other camera $P_c$ coincides with the new position $P_n$. The other camera becomes the current camera, and the current camera becomes the other camera. The newly defined current camera is directed to and viewing the current position of the speaker.

A technical advantage of the present invention is the movement of a camera to a new view only if the speaker's position moves outside of a defined window. Thus, a minor position change is not translated into movement of the camera.

An additional technical advantage of the present invention is the use of a second defined window to determine whether a current camera or other camera should be used to view the speaker when the speaker's position moves outside of the first defined window.

Figure 7:
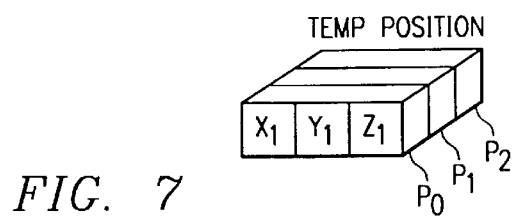
FIG. 7 illustrates one embodiment of camera selection and windowing criteria according to the present invention.

FIG. 7 illustrates one embodiment of camera selection and windowing criteria according to the present invention. As shown, a new position $P_n$, a current camera position $P_c$, an other camera position $P_o$, and a new average position $P_a$ are maintained. In addition, temporary positions $P_0$, $P_1$, and $P_2$ are maintained. The window regions, WINDOW 1 and WINDOW 2, are defined with respect to an allowable difference between two coordinates. The defined differences are used to determine whether a point is too far from a center point of a window to be considered within the window. As shown, the differences, (x_diff1,y_diff1,z_diff1) and (x_diff2,y_diff2,z_diff2), are defined as the product of constants, A to F, and function, $f_a$ to $f_f$, zoom setting.

Initially, the current camera position $P_c$ is set equal to the other camera position $P_o$ which is set equal to the new position $P_n$ In addition, the temporary position marker, t, is set to position "0."

When the camera controller receives a new speaker position, the camera controller determines whether or not a camera needs to move and selects which camera to move. The camera controller first determines whether the absolute value of the difference between one of the coordinates ($x_c,y_c,z_c$) of the current camera position $P_c$ and the corresponding coordinate ($x_n,y_n,z_n$) of the new position $P_n$, is greater than the allowed differences defined by WINDOW 1 (x_diff1,y_diff1,z_diff1). If so, then the new position $P_n$ is stored in temporary position $P_o$ and the index of the temporary position is incremented by one. This process is repeated until the index reaches the number three. The accuracy information may be used to determine if the new position should even be considered as a valid position. This may be performed by establishing a threshold region. If the accuracy information exceeds the threshold, the process responds by discarding a position with a large error.

When all three temporary positions $P_0$, $P_1$ and $P_2$ are filled, there have been three new positions $P_n$ outside the range of WINDOW 1. The camera controller sets the new average position $P_a$ equal to the average of the three temporary positions $P_0$, $P_1$ and $P_2$ It should be understood that, in other embodiments, the number of temporary positions can be higher or lower than three.

After the new average position $P_a$ is set, the camera controller determines whether the absolute value of the difference between one of the coordinates ($x_a$, $Y_a$, $z_a$) of the new average position $P_a$ and a corresponding coordinate ($x_c$, $y_c$, $z_c$) of the current camera position $P_c$ is greater than the differences defined by WINDOW 2 (x_diff2, y_diff2, z_diff2). If so, then the camera controller moves the other camera to be directed to view the new average position $P_a$. The camera controller then sets the other camera position $P_o$ equal to the current camera position $P_c$ and sets the current camera position $P_c$ equal to the new average position $P_a$. The active video signal is then switched between the two cameras to the new current camera.

If, however, the difference between the new average position $P_a$ and the current camera position $P_c$ is not greater than the differences defined by WINDOW 2, the camera controller moves the current camera to be directed to view the new average position $P_a$. The camera controller then sets the current camera position $P_c$ equal to the new average position $P_a$ After a movement of either of the cameras, the camera controller returns to the initial step of measuring new positions versus the differences defined by WINDOW 1.

In this embodiment there are three temporary positions used to produce an average new position. The number of temporary positions can be varied depending on at the time delay desired before moving a camera. In the illustrated embodiment, unless there are three consecutive new positions outside the WINDOW 1 range, the camera controller restarts the accumulation of temporary positions. Once a new average position $P_a$ has been determined, the new average position $P_a$ becomes the current position $P_c$. Any newer position within WINDOW 1 from the new current position $P_c$ is then ignored. WINDOW 1 is used to determine whether a new position should be accumulated, and WINDOW 2 is used to determine whether the current camera should be moved or the other camera should be moved.

A technical advantage of the present invention is the filtering of speaker position information to delay movement of the camera until a new position is verified. In this manner, insignificant noises that might otherwise result in a camera movement are filtered.

Once movement and camera selection have been determined, the camera controller converts the speaker position from Cartesian coordinates to polar coordinates. Depending on the type of camera, appropriate commands for changing the view of the selected camera are generated and provided to the camera. In one embodiment to the present invention, the camera has pan, tilt and zoom (PTZ) controls and comprises a CANON VC-C1 or a PANASONIC KXC-CM775 PTZ camera. It should be understood that where there is only one camera, the current camera position $P_c$ is always set equal to the other camera position $P_o$ in the process described above.

Another aspect of the present embodiment is that the camera used to locate the speaker may be a wide-angle camera. For example, the present embodiment includes the necessary instructions and controller functions so that when a signal appears for the pan-tilt-zoom camera to change its position to another position, the wide-angle camera may move until the desired object or speaker comes into view of the wide-angle picture. Once the speaker is within or near the center of the wide-angle picture, the camera controller will shift to the wide-angle pan-tilt-zoom camera for viewing to continue.

Figure 8:
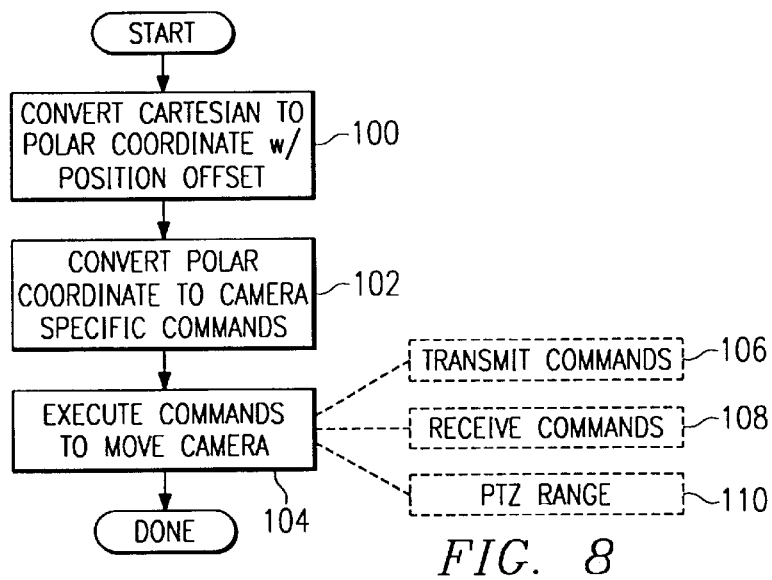
FIG. 8 is a flow chart of one embodiment of a process for generating control signals to move a camera according to the present invention.

FIG. 8 is a flow chart of one embodiment of a process for generating control signals to move a camera according to the present invention. In step 100, the Cartesian coordinates are converted to polar coordinates including a position offset due to the relationship of the microphone array to the camera, if necessary. In step 102, the polar coordinates are used to generate specific camera commands. These camera commands comprise appropriate control signals for the specific type of camera being used. In step 104, the commands to move the camera are executed by the camera. Step 104 may comprise substeps which include transmitting commands to the camera in step 106, receiving commands by the camera in step 108, and assessing the PTZ range of the camera in step 110.

Figure 9:
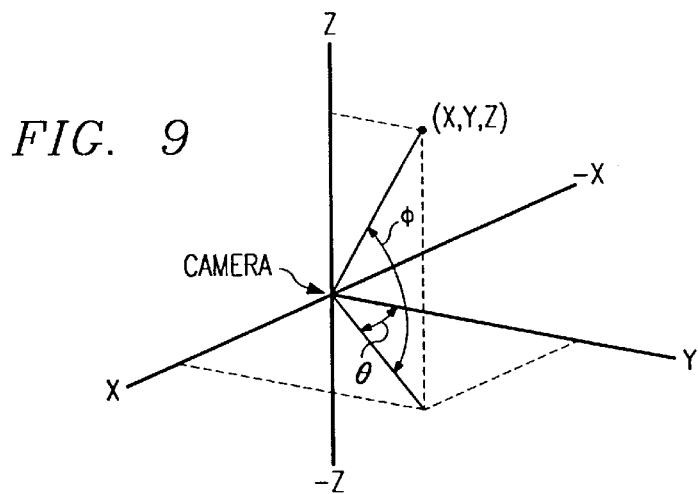
FIG. 9 illustrates conversion of Cartesian coordinates to polar coordinates for use in camera control according to the present invention.

FIG. 9 illustrates conversion of Cartesian coordinates to polar coordinates for use in camera control according to the present invention. As shown in FIG. 9, a Cartesian coordinate (x, y, z) is to be converted to polar coordinates (r, θ, Φ) in the polar coordinate system. The speaker's position is represented by (x, y, z). The camera is located at the origin, as shown. The polar coordinates represent the distance from the camera to the speaker (r), the pan angle of the camera from center to the speaker (θ), and the tilt angle of the camera from center to the speaker (Φ).

The distance (r) from the camera to the speaker is used to determine the appropriate zoom. This distance or range is defined as $$r = \sqrt{x^2 + y^2 + z^2}$$

According to the illustrated convention, a centered camera represents a zero pan angle (θ), where the left side is negative and the right side is positive. Under this convention, the pan angle (θ) is defined as equal to the arctan of (x/y). The tilt angle (Φ) is defined to be zero when the camera is centered, where up is positive, and down is negative. The tilt angle (Φ) is defined to the arctan of $$\left(z \div \left(\sqrt{(x^2 + y^2)}\right)\right).$$

The size of an object or speaker in the picture can be maintained by changing the zoom ratio according to the distance as long as the ratio is in the range of the camera. A default zoom ratio can be set in the initialization routine of the camera controller. The zoom can be adjusted by a user while the camera is in use. The camera controller detects changes and maintains the size of the picture until a user changes the zoom. It has been observed that accuracy of locating a speaker deteriorates, especially in estimating distance, when the speaker is further away from the microphone array. The camera controller can slightly reduce the zoom ratio from the desired value to ensure the size of the picture if the speaker is relatively far from the camera.

Figure 10:
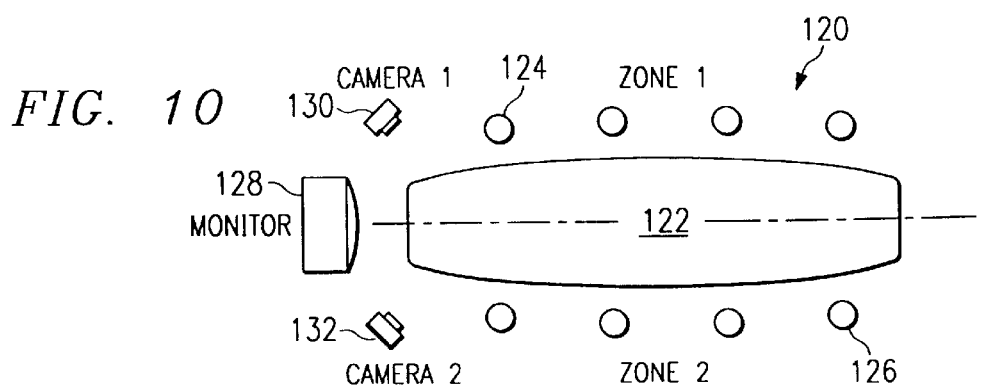
FIG. 10 illustrates one embodiment of zoning a conference room according to the present invention.

FIG. 10 illustrates one embodiment of zoning a conference room according to the present invention. Zoning can be applied to a video conference in which two or more cameras are used. As shown in FIG. 10, a conference room 120 includes a conference table 122. There are four chairs 124 positioned in a first zone, ZONE 1, and four chairs 126 positioned in a second zone, ZONE 2. A first camera 130 is located on one side of the room, as shown, and a second camera 132 is located on the opposite side of the room. A TV monitor 128 for showing video received from the other video conference site is positioned at one end of conference table 122.

In this embodiment, conference room 120 is divided into two zones. Zoning of the conference room avoids problems caused by using only one camera such as an inability to capture a full view of all speakers. A typical video conference room has a long conference table and two rows of chairs as shown in FIG. 10.

According to the present invention, conference room 120 is divided into ZONE 1 and ZONE 2. Camera 130 and camera 132 are used to track speakers depending upon the zone in which the speakers are positioned. For example, camera 130 is used to track speakers in ZONE 2, and camera 132 is used to track speakers in ZONE 1. Analogous zoning can be applied to multiple cameras each dedicated to one of a number of zones where a room is larger or where capturing a direct image of each speaker is important. Each speaker position will be located within a zone which then determines which camera or cameras are used to track that speaker position and view the speaker.

A technical advantage of the present invention is this use of zoning of a conference room. The conference room is divided into a number of zones each associated with one camera. Each camera is then controlled to view speakers within its associated zone.

Although the present invention has been described in detail, it should be understood that various changes, substitutions, and alterations can be made hereto without departing from the spirit and scope of the invention as defined by the appended claims.

What is claimed is:

1. An automatic voice tracking camera system, comprising:
    a first camera operable to receive control signals for controlling a view of the first camera; and
    a camera controller coupled to the first camera, the camera controller operable:
        to determine a responsive camera movement of the first camera based upon coordinates for a point in space, the determination comprising comparing the coordinates with a first spacial region defined around a current speaker position;
        to generate camera control signals based upon the appropriate responsive camera movement; and
        to provide the camera control signals to the first camera.

2. The automatic voice tracking camera system of claim 1, wherein the responsive camera movement comprises viewing the coordinates without moving the first camera when the coordinates are inside the first spacial region.

3. The automatic voice tracking camera system of claim 2, wherein the camera controller, in determining the responsive camera movement, further compares the coordinates with a second spacial region defined around the current speaker position.

4. The automatic voice tracking camera system of claim 3, wherein the responsive camera movement comprises moving the first camera to view the coordinates when the coordinates are outside of the first spacial region and inside the second spacial region.

5. The automatic voice tracking camera system of claim 4, further comprising:
    a second camera operable to receive control signals for controlling a view of the second camera; and
    the camera controller coupled to the second camera, the camera controller further operable:
        to determine a responsive camera movement of the second camera based upon coordinates for a point in space, the determination comprising comparing the coordinates with the first spacial region and a second spacial region defined around a current speaker position;
        to generate camera control signals based upon the appropriate responsive camera movement; and
        to provide the camera control signals to the second camera.

6. The automatic voice tracking camera system of claim 5, wherein the responsive camera movement of the second camera comprises moving the second camera to view the coordinates when the coordinates are outside of both the first spacial region and the second spacial region.

7. The automatic voice tracking camera system of claim 1, wherein the camera controller is further operable to filter the coordinates to delay movement of the first camera until a new speaker position is verified.

8. The automatic voice tracking camera system of claim 7, wherein the new speaker position is verified by storing and averaging a plurality of coordinates for temporary speaker positions.

9. An automatic camera controller for controlling a camera, the automatic camera controller comprising:
    a camera controller operable:
        to determine a responsive camera movement of the first camera based upon coordinates for a point in space, the determination comprising comparing the coordinates with a first spacial region defined around a current speaker position;
        to generate camera control signals based upon the appropriate responsive camera movement;
        to provide the camera control signals to the first camera; and
    an interface coupled to the camera controller, the interface operable to communicate with a host video conference system and with the camera controller.

10. The automatic camera controller of claim 9, wherein the responsive camera movement comprises viewing the coordinates without moving the first camera when the coordinates are inside the first spacial region.

11. The automatic camera controller of claim 10, wherein the camera controller, in determining the responsive camera movement, further compares the coordinates with a second spacial region defined around the current speaker position.

12. The automatic camera controller of claim 11, wherein the responsive camera movement comprises moving the first camera to view the coordinates when the coordinates are outside of the first spacial region and inside the second spacial region.

13. The automatic camera controller of claim 12, wherein the camera controller is further operable:
    to determine a responsive camera movement of a second camera based upon coordinates for a point in space, the determination comprising comparing the coordinates with the first spacial region and a second spacial region defined around a current speaker position;
    to generate camera control signals based upon the appropriate responsive camera movement; and
    to provide the camera control signals to the second camera.

14. The automatic camera controller of claim 13, wherein the responsive camera movement of the second camera comprises moving the second camera to view the coordinates when the coordinates are outside of both the first spacial region and second spacial region.

15. The automatic camera controller of claim 9, wherein the camera controller is further operable to filter the coordinates to delay movement of the first camera until a new speaker position is verified.

16. The automatic camera controller of claim 15, wherein the new speaker position is verified by storing and averaging a plurality of coordinates for temporary speaker positions.

17. A method of automatically controlling a camera, comprising:

determining an appropriate responsive camera movement from coordinates for a point in space, the determining comprising comparing the coordinates with a first spacial region defined around a current speaker position;

generating camera control signals based upon the appropriate responsive camera movement; and providing the camera control signals to a first camera.

18. The method of claim 17, wherein the responsive camera movement comprises viewing the coordinates without moving the first camera when the coordinates are inside the first spacial region.

19. The method of claim 18, wherein determining the responsive camera movement further comprises comparing the coordinates with a second spacial region defined around the current speaker position.

20. The method of claim 19, wherein the responsive camera movement comprises moving the first camera to view the coordinates when the coordinates are outside of the first spacial region and inside the second spacial region.

21. The method of claim 20, further comprising:

determining an appropriate responsive camera movement of a second camera from the coordinates, the determining comprising comparing the coordinates with the first spacial region and a second spacial region defined around a current speaker position;

generating camera control signals based upon the appropriate responsive camera movement of the second camera; and providing the camera control signals to the second camera.

22. The method of claim 21, wherein the responsive camera movement of the second camera comprises moving the second camera to view the coordinates when the coordinates are outside of both the first spacial region and second spacial region.

23. The method of claim 17, further comprising filtering the coordinates to delay movement of the first camera until a new speaker position is verified.

24. The method of claim 23, wherein the new speaker position is verified by storing and averaging a plurality of coordinates for temporary speaker positions.

* * * * *